United States Patent [19]
Caillaud et al.

[11] 3,963,619
[45] June 15, 1976

[54] APPARATUS FOR THE PREVENTION OF SCALING IN DESALINATION APPARATUS

[75] Inventors: Andre Caillaud, Garches; Pierre Charuit, Montpellier; Claude Duffau, Toulon; Jean Ravoire, Grenoble, all of France

[73] Assignees: Commissariat a l'Energie Atomique; Compagnie des Salins du Midi et des Salines de l'Est, both of Paris, France

[22] Filed: Feb. 28, 1974

[21] Appl. No.: 501,299

[30] Foreign Application Priority Data
Sept. 7, 1973  France .......................... 73.32373

[52] U.S. Cl. ........................... 210/256; 210/532 R
[51] Int. Cl.² ........................................ B01D 21/02
[58] Field of Search ............... 210/46, 56, 84, 181, 210/256, 532 R, 538–540

[56] References Cited
UNITED STATES PATENTS

| | | | |
|---|---|---|---|
| 885,451 | 5/1907 | Deming | 210/56 X |
| 1,199,099 | 9/1916 | Munzer | 210/256 |
| 2,401,924 | 6/1946 | Goetz | 210/46 |
| 2,979,442 | 4/1961 | Badger | 210/46 X |
| 3,026,261 | 3/1962 | Mayfield et al. | 210/46 X |
| 3,239,067 | 3/1966 | Hikes et al. | 210/532 R |
| 3,399,975 | 9/1968 | Otten | 210/46 X |
| 3,583,910 | 6/1971 | Stoddard | 210/46 |
| 3,764,012 | 10/1973 | Bohnke et al. | 210/256 |

*Primary Examiner*—Thomas G. Wyse
*Attorney, Agent, or Firm*—Lane, Aitken, Dunner & Ziems

[57] ABSTRACT

Apparatus for separating solids from a liquid suspension using an evaporator/decanter having an outer and inner vessel and an inverted funnel member housed within the inner vessel, the leg of the funnel extending through the top of the inner vessel. A gutter member, mounted around the inner circumference of the inner vessel collects the clarified water. In a process for removing scaling agents from sea water, seed crystals are added to the sea water which is then heated to a temperature above the solubility limits of the scaling agents and above the operating temperatures of a desalination unit to cause the scaling agent to crystallize on the seed crystals. The seed crystal solution is then fed into the outer vessel of the apparatus to effect removal of the crystals and produce a clarified sea water feed for the desalination unit.

4 Claims, 4 Drawing Figures

APPARATUS FOR THE PREVENTION OF SCALING IN DESALINATION APPARATUS

BACKGROUND OF THE INVENTION

The present invention relates to apparatus for the pretreatment of sea water or briny water to prevent scaling in desalination apparatus.

It is known that apparatus for producing fresh water from sea water or briny water which operates on the evaporation-distillation principle has a limited capacity owing to upper temperature and operating limits imposed by scaling.

The principal ions directly or indirectly responsible for scaling are, in the case of sea water, calcium and magnesium cations and bicarbonate and sulfate anions; the nature of the deposit which forms is dependent on the operating temperature.

To prevent calcium carbonate deposits, it is possible to use adsorbents or growth inhibitors such as polyphosphates. It is also possible to decompose the carbonate by the injection of an acid, for example, sulfuric acid, and degassing. In the case of calcium sulfate, a conventional method of preventing crystallization consists in limiting the temperatures and concentrations of the brine so that the thermodynamic conditions of precipitation never occur in the course of the evaporation-distillation cycles. However, this method, which is advantageous because it does not necessitate any initial chemical processing, is obviously subject to a certain temperature limitation, i.e. on the order of 120°C, and, therefore, is not compatible with the objective of obtaining maximum yields from the evaporation-distillation process. It is also possible to remove the greater part of the calcium ions by a softening process, e.g. by ion exchange, although the cost of such a process is prohibitive.

It is known that the scaling problem can be economically reduced to permit operation of the evaporators at high temperatures in excess of 120°C by the introduction of crystalline nuclei into the heated sea water. The addition of the nuclei to a metastable or over-saturated solution results in the deposition or crystallization of the salts in solution on the nuclei, and thereby avoids nucleation of these salts on the heated walls of the evaporator.

In this type of treatment, crystalline nuclei (for example, anhydrite) are added to the untreated sea water before it enters the evaporation unit wherein it is progressively heated by its passage through the condensers of the unit. This preheating of the crude sea water, a conventional step in any distillation process, is continued to a higher temperature than that of the first stage of the evaporation unit and to a higher temperature than that corresponding to the limit of solubility in water of the alkaline-earth carbonates and calcium sulfate scaling agents.

In the course of this heating operation, crystallization of these compounds occurs and the carbonates and sulfate crystals grow on the suspended anhydrite nuclei.

Sea water at a high temperature, e.g. 170°C, containing a mixture of crystals in suspension is thus obtained. Before introduction into the first stage of the evaporator, it is necessary to clarify this water by removing the suspended crystals. If the suspended crystals are not removed they will redissolve during the cooling of the water in the successive stages of the evaporation unit and form scale on the various ducts in the evaporation unit. This scaling would result in lowering the efficiency of the desalination process. Thus, it is absolutely essential to remove the crystals of alkaline-earth carbonate salts and calcium sulfate before cooling and/or evaporation.

The temperature and pressure of the water requiring clarification (temperature in excess of 120°C) make it difficult and costly to employ a standard decanter/centrifuge or filter; such apparatus must be specifically designed to permit reliable operation under these conditions.

SUMMARY OF THE INVENTION

The present invention relates to a device of simple design for decanting crude sea water solutions containing the above-mentioned scaling salts and which lends itself to use in combination with conventional apparatus used in desalination processes, e.g. multiple effect evaporation units (for example, a descending evaporation unit) and evaporation-distillation units operating on the expansion and recycling principle. More particularly, the present invention relates to an evaporator/decanter and to its use in combination with the various types of process equipment used in desalination processes.

The apparatus of the present invention is provided with inner and outer vertically mounted vessels or containers having generally cylindrical upper portions closed by conically shaped bottom portions. The inner vessel is mounted centrally within the outer vessel and houses an inverted funnel member. The funnel member has a lower conical portion and an upper leg portion which extends through the top of said inner vessel. The apparatus is additionally provided with means for introducing a liquid suspension of solids, vapor discharge means, solids discharge means and liquid discharge means for removing the clarified water. The liquid discharge means includes a gutter or trough member situated around the inner circumference of said inner vessel near the top thereof and a duct for removal of liquid from the interior of the gutter to a point remote from the apparatus. A second solids discharge means is provided for the removal of solids which collect in the bottom conical portion of the outer vessel.

In the process of the present invention, employing the apparatus described above, seed crystals (e.g. calcium carbonate crystals in the form of anhydrite) are added to the water to form a suspension therein and then heated to a temperature above the solubility limit of the scaling agents to cause the scaling agents to crystallize or deposit on the seed crystals. This liquid suspension of crystals ("cloudy" water) is then introduced into the outer vessel of the above-described apparatus for the purpose of separating the crystals from the water. The decanted and clarified water is removed from the gutter located in the upper portion of the inner vessel and may be used as a feed water for supply to the first stage or effect of a standard desalination unit. A portion of the crystals removed from the bottom of the evaporator/decanter of the present invention may be used as seed crystals for addition to the water prior to the heating and separation as described above.

The present invention also contemplates a desalination process in which the apparatus of the present invention is used in combination with a multiple effect evaporation unit. In this embodiment the sea water feed, after addition of the seed crystal, is heated by passage through the series of condensers associated with the various effects of the evaporation unit and then injected into the outer vessel of the evaporator/decanter. In this embodiment, the evaporator/decanter operates as an evaporator and as the first stage or effect of the evaporation/distillation system. The evaporator/decanter is maintained at a temperature higher than the temperatures within the various effects of the desalination unit proper. The preheated sea water which enters the decanter of the present invention flashes upon entry producing water vapor or steam which may be reused as a heat source by injection into an interposed heat exchanger or at a suitable point with the multiple effect evaporator (e.g. the first effect).

In heating the feed to the evaporator/decanter to effect crystallization of the scaling agents, it is preferable to interpose a heat exchanger between the evaporator/decanter and the desalination unit proper unit and to employ operating temperatures such that the clarified sea water leaving the evaporator/decanter is at a higher temperature than the feed to the first stage or effect of the desalination unit. In this manner, the water may be pretreated in such a way that it will not form scale within the successive stages or effects of a desalination unit even at high temperatures, e.g. $170°-\frac{1}{2}°C$.

If the evaporation unit is a conventional multiple effect evaporation unit, e.g. a descending unit (described in the article published in the review "Chimie Industrie Genie Chimique", volume 101, No. 5, March 1969), before the "cloudy" sea water is introduced into a first heat exchanger $C_1$, it passes through the shell side of a second heat exchanger $C_2$, to the tube side of which is supplied water vapor exiting the evaporator/decanter, so that the clear sea water entering the first stage of the evaporation unit is a temperature $\theta_2$, a temperature lower than temperature $\theta_1$ at which sea water and the vapor leave the evaporator/decanter.

In this way, sea water exiting the evaporator/decanter is cooled by its passage through the heat exchanger $C_2$ with the result that it is possible to evaporate this clear sea water in the first stage of the evaporation unit by means of the vapor issuing from the evaporator/decanter at temperature $\theta_1$. Heat exchanger $C_2$ also operates to reduce the temperature of the sea water to a temperature which is definitely lower than that of the saturation point of the calcium sulfate, thereby avoiding any risk of scaling in the first stages of the evaporation unit.

The evaporator/decanter of the invention may be located inside the first stage of the evaporation/distillation installation as long as the dimensions of the lower part of the evaporator/decanter allow this. In this case, heating of the sea water solution with steam may be effected by the heating means associated with the first stage of the evaporation unit.

Other features and advantages of the present invention will become apparent from the following description of various embodiments thereof which are provided by way of non-limitative examples with reference to the accompanying drawings.

DESCRIPTION OF THE PREFERRED EMBODIMENTS

As previously noted, the present invention is directed to the removal of scaling agents from water in an evaporator/decanter and to a pretreatment for water to be introduced into a standard or modified desalination unit.

Figure 1:
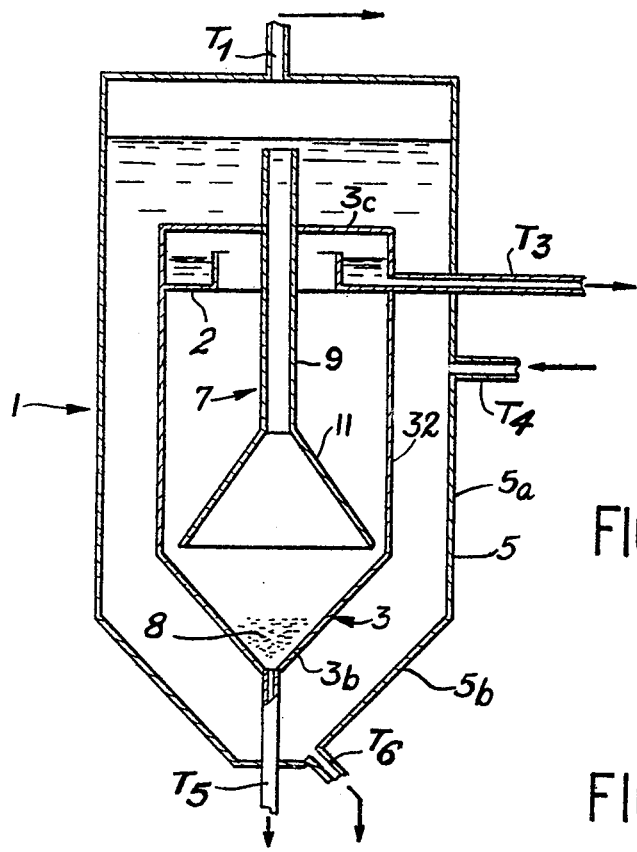
FIG. 1 is an elevantional view, cross-section, of an embodiment of the evaporator/decanter.

In FIG. 1 an embodiment of the evaporator/decanter of the present invention is generally designated by the numeral 1 and is shown as having an inner vessel 3 mounted within an outer vessel 5. The inner vessel or container 3 is provided with a generally cylindrical body portion 3a and a generally conical base portion 3b. Likewise, outer vessel or container 5 has a generally cylindrical body portion 5a and a generally cone-shaped bottom portion 5b. The outer vessel 5 is further provided with means, in the form of an inlet $T_4$, for the introduction of the "cloudy" sea water containing the crystalline nuclei. The inner vessel 3 is provided with a gutter of trough 2 around its inner circumference near the upper end of the cylindrical body portion 3a. Trough 2 serves to collect the clarified sea water which is then discharged through the water discharge means $T_3$. The inner vessel 3 is further provided with an inverted funnel member 7 having an upper riser or pipe 9 and a lower cone portion 11. The funnel member is rigidly mounted within the upper end portion 3c of inner vessel 3. the inner vessel 3 and the outer vessel 5 are respectively provided with crystal discharge means $T_5$ and $T_6$.

In operation, the cloudy warm sea water is introduced through pipe $T_4$ and it fills the evaporator/decanter 1 to a level above the mouth of the pipe 9. The level of the liquid in the container $E_1$ is kept constant by means of a suitable regulating device (not shown). The regulating device may be, for example, one consisting of a float which enables the sea water to enter the container 5 through the pipe $T_4$ by opening a suitable valve (not shown).

Owing to the pressure prevailing in the evaporator/decanter, the sea water flashes upon entering the container 5 and part of the water is transformed into vapor which is discharged via the pipe $T_1$. The sea water containing suspended crystals penetrates pipe $T_2$ and is decanted. The clear sea water collects in the circular gutter 2 and is discharged by pipe $T_3$.

The crystals 8 which are decanted collect at the bottom of cone 3b and are discharged via pipe $T_5$. Discharge means $T_6$ located at a low point in cone 5b enables the evaporator/decanter 1 to be emptied and also permits removal of the crystals which collect in cone 5b.

Figure 2:
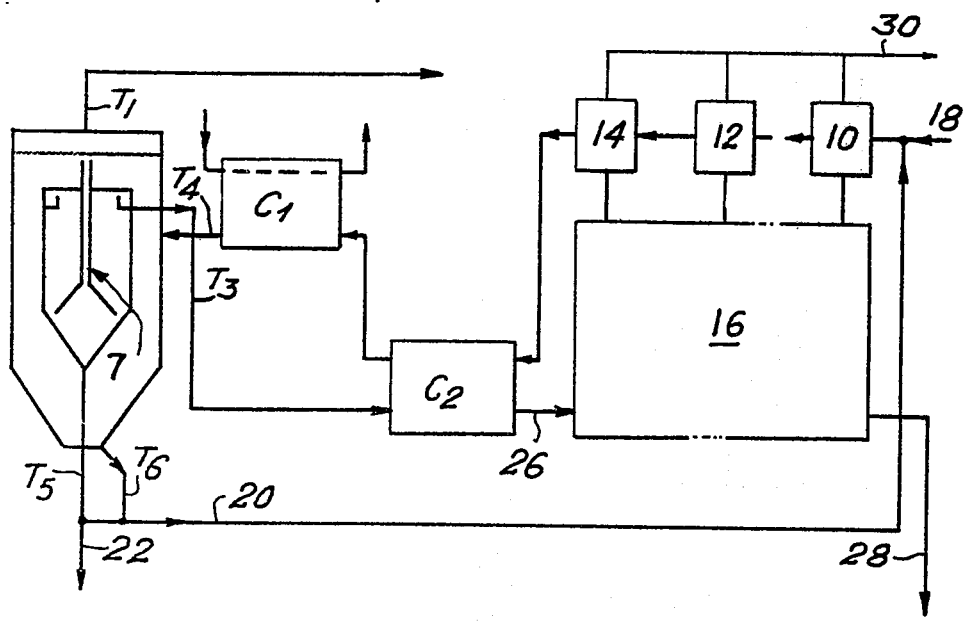
FIG. 2 is a schematic diagram of a desalination process employing a multiple effect evaporation unit.

FIG. 2 depicts a desalination plant having a plurality of evaporate stages or effects including the evaporate/decanter of the present invention. The multiple effect evaporation unit 16 is provided with a series of condensers 10, 12, 14, two heat exchangers $C_1$ and $C_2$ and piping connecting the unit with the heat exchangers and the evaporator/decanter.

In the system depicted in FIG. 2 crystal nuclei coming from the evaporator/decanter by way of the pipe 20, containing the mixed discharge the pipes $T_5$ and $T_6$, are added to the crude sea water being supplied at 18. A second portion of crystals discharged from the decanter 7 are removed from the system via pipe 22. The sea water containing the seed crystals is then progressively heated, in the condensers 10, 12 and 14 associated with different stages of an evaporation/distillation unit, to temperatures in excess of those corresponding to the limits of solubility of the alkaline earth carbonates and calcium sulfate to produce crystallization of these compounds.

The preheated water is then routed through exchanger $C_2$ and then exchanger $C_1$, the shell side of which is supplied with steam countercurrently as indicated by the arrow. The heat exchanger $C_1$ is the only part of the decanting desalting installation to which heat is supplied from an auxiliary source. After exiting the tube side of heat exchanger $C_1$, the sea water enters the evaporator/decanter via pipe $T_4$. The water vapor issuing from the pipe $T_1$ of the evaporator/decanter may be used to heat the first stage of the evaporation/distillation unit 16. The clarified sea water from which the scaling salts have been removed is discharged through pipe $T_3$. It is cooled in the heat exchanger $C_2$ and is thereafter introduced into the first stage of the evaporation unit by way of pipe 26. The concentrated brine discharged via pipe 28 is either thrown away or it may constitute a supply of non-scaling water for a second conventional evaporator, the first stage temperature of which is lower than that of the water at the output of the evaporator/decanter. Fresh condensed water is collected at 30.

As will be appreciated by those skilled in the art, the evaporator/decanter of the present invention actually operates as the first stage of the evaporation/distillation system and may be either independent of the multiple effect unit or may be fully integrated therewith as shown.

Figure 3:
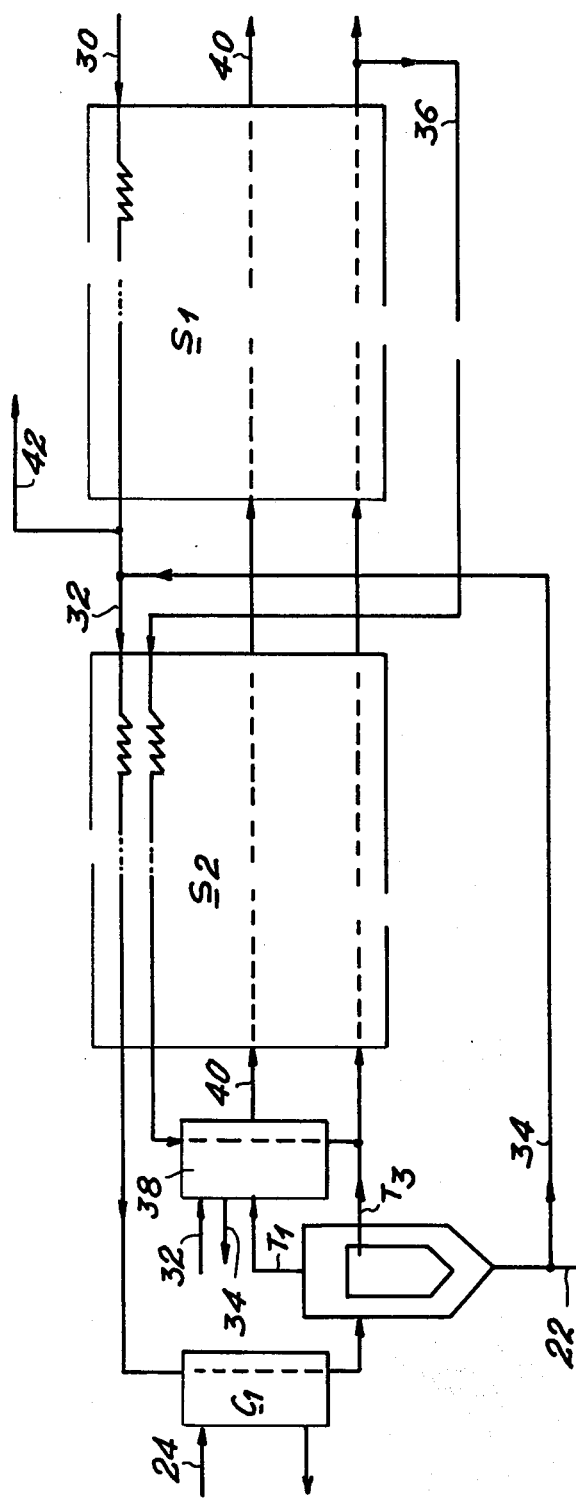
FIG. 3 is a schematic diagram of a desalination process operating on the successive expansion system with recycling, as used in combination with the evaporator/decanter of FIG. 1.

FIG. 3 shows a desalination system having two series of evaporation/distillation effects. The first series of effects $S_1$ is used to heat the sea water being supplied at 30. The second series of effects $S_2$ is used to heat both 1) the sea water entering at 32 after being mixed with the slurry of crystals supplied through line 35 from the evaporator/decanter and 2) the brine recycled via 36 from the outlet of the last stage of the series $S_1$. This embodiment is also provided with a heat exchanger 38 for the clarified brine and a heat exchanger $C_1$ for preheating the sea water prior to entry into the evaporator/decanter. As in the embodiment of FIG. 2, the heat exchanger $C_1$ is supplied with live steam via 24.

In the process depicted in FIG. 3, the first stage of the multiple effect evaporation unit is heated by the water vapor exiting the top of the container 5 of the evaporator/decanter. The multiple effect units $S_1$ and $S_2$ operate with flashing and provide recycling of the brine. Before adding the seed crystals to the sea water the water is first heated by successive passage through the condensers associated with the series of effects $S_1$. After the crystalline nuclei have been added the sea water is then heated to a higher temperature in a second series of condensers of multiple effect unit $S_2$. This heating of the crude sea water is effected in parallel with the heating of the brine obtained at the output of the two series of effects $S_1$ and $S_2$ which is recycled to the input of the condensers in the series $S_2$. The water vapor issuing from the evaporator/decanter is used to heat, at least partially, the brine obtained at the output of the last condenser crossed in the series $S_2$. This brine is then emptied into the evaporation tank of the first effect of the series $S_2$ of evaporators and the clarified sea water coming from the evaporator/decanter is also injected into this first effect.

It is not necessary to mix seed crystals with the crude sea water in the first series of condensers of the $S_1$ because the temperature corresponding to the saturation point for the alkaline earth carbonates and calcium sulfate is not reached; at these low temperatures these scaling agents do not precipitate. The sea water with the admixed seed crystals and the warm brine issuing from the two series of stages $S_1$ and $S_2$ of the unit are passed in parallel through the series of condensers associated with the effects of series $S_2$. This brine is approximately at the same temperature as the crude sea water in the parallel ducts. This recycling feature makes it possible to conserve heat and contributes to the economics of the system. The water vapor leaving the evaporator/decanter is used to preheat the brine before the brine is mixed with the clarified sea water leaving the evaporator/decanter. In this way, the heat contained in the vapor leaving the evaporator/decanter is utilized in heat exchanger 38. It is obviously not necessary to add anhydrite nuclei to the brine being recycled, because this brine comes from the clarified sea water from which the major part of the scaling agents have been removed.

The stages or effects of the evaporation/distillation unit operate at a lower temperature than that of the clear sea water at the output of the evaporator/decanter, and thereby are not subject to fouling by scaling.

Thus, the heat exchanger 30 which preheats the clarified brine is heated in part with vapor entering at 32 and exiting at 34 and in part by the water vapor from the flashing of sea water in the evaporator/decanter. The condensed water vapor is thereafter discharged via collector pipe 40 which collects the pure water produced in all the effects of the evaporation/distillation unit. At the output of the heat exchanger 38, the brine is mixed with clarified sea water exiting the evaporator/decanter by way of pipe $T_3$ and then enters the first effect of series $S_2$ of the evaporation/distillation unit. Excess heated crude sea water is discharged through pipe 42.

Figure 4:
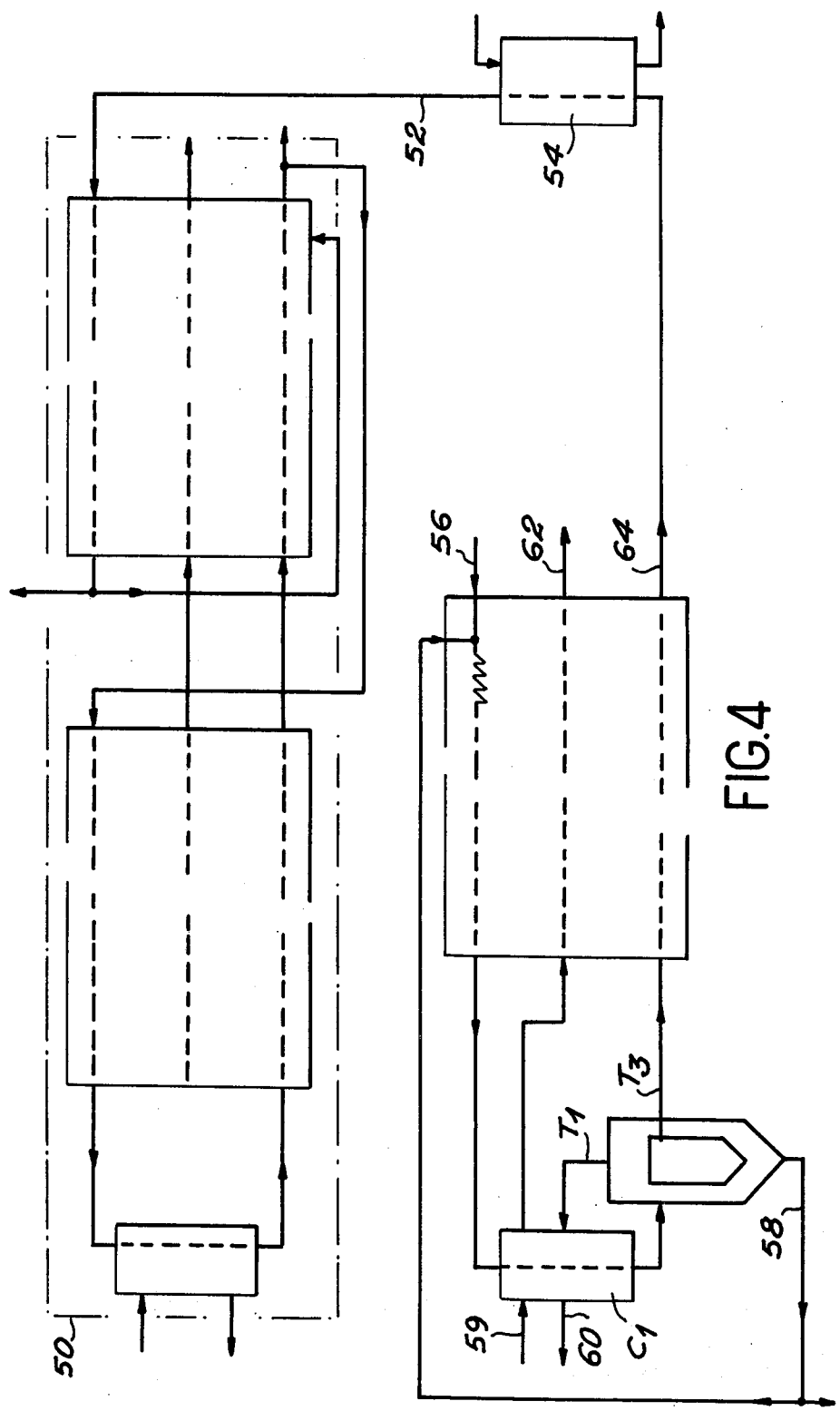
FIG. 4 is a schematic diagram of a desalination process employing two evaporation units in series, the first unit supplying brine from which scaling agents have been removed to the second vaporization/distillization unit.

The present invention also contemplates a process wherein the evaporator/decanter is used in combination with a flash type evaporation unit having an open cycle. FIG. 4 shows an embodiment of such a process for clarifying a sea water feed to a conventional evaporation/distillation unit 50. The apparatus 50 will not be described in detail since it is a conventional unit. The clarified brine from which the greater part of the scaling agents have been removed is introduced into the unit 50 by way of the pipe 52 after passage through a heat exchanger 54. Heat exchanger 54 serves to cool the brine to a temperature suitable for feed to first condenser of the evaporation/distillation unit 50. This brine is produced by an auxiliary desalting unit 70 which serves to remove the scaling agents and which operates by flashing and with an open loop. In this unit, the sea water is supplied by way of the pipe 56 to a series of condensers where it is heated after having been mixed with anhydrite nuclei supplied by the pipe 58 from the evaporator/decanter. This heated cloudy water passes through the heat exchanger $C_1$, the shell side of which is heated by steam entering at 59 and exiting at 60 and also by the water vapor which enters via the pipe $T_1$ from the evaporator/decanter. The pure water which is discharged from this first evaporation unit is collected in the pipe 62. The clear sea water which exits the evaporator/decanter via $T_3$ is introduced into the first stage of the evaporation/distillation unit 70 and a brine is obtained at 64 from which the greater part of the scaling agents have been removed. After passing through the heat exchanger 54, this brine is supplied via the pipe 52 to feed the evaporation/distillation unit 50.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning range of equivalency of the claims are therefore intended to be embraced therein.

We claim:

1. An apparatus for the separation of solids from a liquid suspension to produce a solids stream and a stream of clarified liquid, said apparatus comprising:
   a closed inner vessel mounted within an outer vessel and spaced therefrom to define a continuous liquid space, said liquid space enabling the inner vessel to be totally covered and surrounded by a continuous body of the liquid dispersion;
   an inverted funnel member comprising a lower cone portion disposed within and opening into said inner vessel and an upper duct portion extending into and opening into said outer vessel at an inlet point within the liquid space covering said inner vessel, thereby providing fluid communication between said inner and outer vessels;
   means for introducing the liquid suspension into said outer vessel;
   first solids discharge means for removing solids which collect at the bottom of said outer vessel, said inner vessel being interposed between said first discharge means and said inlet point;
   second solids discharge means for removing solids which collect at the bottom of said inner vessel; and
   liquid discharge means for removing the clarified liquid from the upper interior of said inner vessel, said liquid discharge means comprising a gutter member mounted within said upper interior of said inner vessel and duct means, in communication with said gutter means for removing liquid from said gutter member;
   said second solids discharge means and said duct means extending through the walls of said outer vessel.

2. The apparatus of claim 1 wherein said outer vessel is a closed vessel and is provided, near its top, with a vent for the discharge of gas.

3. The apparatus of claim 1 wherein said inner and said outer vessels each have a generally cylindrical vertical upper portion and a generally conical bottom portion integral with and closing the bottom of said upper portion.

4. The apparatus of claim 1 wherein said gutter member extends around the inner circumference of said cylindrical portion of said inner vessel.

* * * * *